(12) United States Patent
Trandel et al.

(10) Patent No.: US 8,170,094 B2
(45) Date of Patent: May 1, 2012

(54) METHOD AND SYSTEM FOR SCALABLE BITSTREAM EXTRACTION

(75) Inventors: Mark R. Trandel, Palatine, IL (US); Aggelos K. Katsaggelos, Chicago, IL (US); Sevket D. Babacan, Evanston, IL (US); Shih-Ta Hsiang, Schaumburg, IL (US); Faisal Ishtiaq, Chicago, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1378 days.

(21) Appl. No.: 11/752,567

(22) Filed: May 23, 2007

(65) Prior Publication Data

US 2008/0130757 A1    Jun. 5, 2008

Related U.S. Application Data

(60) Provisional application No. 60/868,067, filed on Nov. 30, 2006.

(51) Int. Cl.
*H04N 7/24* (2006.01)
(52) U.S. Cl. ............... 375/240; 375/240.21; 375/240.25
(58) Field of Classification Search ........................ None
See application file for complete search history.

(56) References Cited

U.S. PATENT DOCUMENTS

| | | | |
|---|---|---|---|
| 6,961,383 B1 * | 11/2005 | Reibman et al. ......... | 375/240.25 |
| 2003/0138042 A1 | 7/2003 | Chen et al. | |
| 2005/0163224 A1 * | 7/2005 | Shin et al. ............... | 375/240.25 |
| 2007/0053426 A1 * | 3/2007 | Lee et al. ..................... | 375/240 |

FOREIGN PATENT DOCUMENTS

EP    1528811 A    5/2005

OTHER PUBLICATIONS

The State Intellectual Property Office of the People's Republic of China, "Notification of the First Office Action" for Chinese Pat. Appln. No. 200780044196.2, Jun. 24, 2010, 10 pages.
Joint Video Team (JVT) of ISO/IEC Moving Pictures Experts Group (MPEG) and ITU-T Video Coding Experts Group (VCEG) (ISO/IEC JTC1/SC29/WG11 and ITU-T SG16 Q.6), Joint Scalable Video Model (JSVM) 4.0 Reference Encoding Algorithm Description (N7556); Oct. 2005, 41 pages.

(Continued)

*Primary Examiner* — Ponnoreay Pich
(74) *Attorney, Agent, or Firm* — Pablo Meles; Sylvia Chen (57) ABSTRACT

A scalable video compression system (100) having an encoder (120), bit extractor (140), and decoder (160) for efficiently encoding and decoding a scalable embedded bitstream (130) at different video resolution, framerate, and video quality levels is provided. Bits can be extracted in order of refinement layer (136), followed by temporal level (132), followed by spatial layer (134), wherein each bit extracted provides an incremental improvement in video decoding quality. Bit extraction can be truncated at a position in the embedded bitstream corresponding to a maximum refinement layer, a maximum temporal level, and a maximum spatial layer. For a given refinement layer, bits are extracted from all spatial layers in a lower temporal level prior to extracting bits from spatial layers in a higher temporal level for prioritizing coding gain to increase video decoding quality, and prior to moving to a next refinement layer.

17 Claims, 7 Drawing Sheets

OTHER PUBLICATIONS

Joint Video Team (JVT) of ISO/IEC Moving Pictures Experts Group (MPEG) and ITU-T Video Coding Experts Group (VCEG) (ISO/IEC JTC1/SC29/WG11 and ITU-T SG16 Q.6), Joint Scalable Video Model (JSVM) 4.0—Annex G (N7556—Annex G), Oct. 2005, 165 pages.

Joint Video Team (JVT) of ISO/IEC Moving Pictures Experts Group (MPEG) and ITU-T Video Coding Experts Group (VCEG), JSVM Software Manual (JSVM 6.8.2), Oct. 13, 2006, 67 pages.

Patent Cooperation Treaty, "International Search Report and Written Opinion", ISA/EP, by Officers Raoul Emme and Guido Heising in PCT Application No. PCT/US07/082182; Document of 14 pages dated Jun. 25, 2008.

Kim et al., "Bit-Stream Extraction to Maximize perceptual Quality Using Quality Information Table in SVC", pp. 1-11, XP-002483903, Proceedings of SPIE—International Society for Optical Engineering 2006, vol. 6077, Jan. 17, 2006.

Mukherjee et al., "Structured Scalable Meta-Formats (SSM) Version 1.0 for Content Agnostic Digital Item Adaptation" Video Standards and Drafts No. M9131; XP030038059, Nov. 26, 2002.

Amonou et al., "Optimized Rate-Distortion Extraction with Quality layers in the H.264/SVC Scalable Video Compression Standard", pp. 1-9; Joint Video Team JVT of ISO MPEG & ITU-T VCEG, Document JVT-U144, XP-002483907, Oct. 20, 2006.

Wien et al., "Performance Analysis of SVC", Circuits and Systems for Video Technology, IEEE Transactions on vol. 17, Issue 9, Sep. 2007, summary only or XP002483907.

* cited by examiner

310 — For FGS_refinement = 0 : highest_refinement
312 — For Temporal_level = 0 : highest_level
314 — For Spatial_layer = 0 : highest_layer
316 — Include data from the current refinement, spatial layer, and temporal level
If the assigned bit budget is reached (use fractional refinement if necessary), then exit

FIG. 10

METHOD AND SYSTEM FOR SCALABLE BITSTREAM EXTRACTION

CROSS REFERENCE TO RELATED APPLICATIONS

This application claims the benefit of U.S. Provisional Patent Application No. 60/868,067, filed Nov. 30, 2006, the entire contents of which are incorporated by reference herein.

FIELD OF THE INVENTION

The present invention relates to video coding, and more particularly, to scalable video compression.

BACKGROUND OF THE INVENTION

The use of portable electronic devices and mobile communication devices has increased dramatically in recent years. Moreover, the demand for video enabled mobile devices is rapidly increasing. Video processing requires a significant amount of signal processing and places high processing demand on a mobile device having limited computational power and battery power. Accordingly, video is generally received in a compressed format to reduce the amount of data required to represent the images. The compressed data also facilitates real time data delivery as the amount of data to be transmitted is decreased. Video coding is the process of encoding the video into a compressed format.

In traditional video compression, a video sequence is encoded into a compressed bitstream, which can later be decoded to obtain a reconstruction of the original video sequence. This system consists of one encoder and one decoder. Video compression can be extended upon to provide scalability. Scalability allows for an adjustment of video quality based on available hardware or software resources. Scalability also provides a platform for seamless mobility and which allows users to efficiently consume video contents across different video devices and transmission channels. For example, certain hardware may only support a range of framerates or a range of bitrates. A scalable video compression system allows the hardware to support various decoding options scaling to the hardware resources.

Scalable video compression (SVC) produces an embedded bitstream that can be truncated at different segmentation points (i.e. locations within the embedded bitstream) to produce reconstructed videos with different desired parameters such as resolution, framerate, and quality. As an example, referring to FIG. 1, a scalable video compression (SVC) system can consist of an encoder 120, a bitstream extractor 140, and a decoder 160. The encoder 120 can compress the video input and generate an embedded bitstream 130 with bits representing the video input. The SVC system 100 can receive user input parameters 145 for setting a video decoding quality. The SVC system 100 is scalable in the sense that the video decode quality can be scaled in accordance with the parameters 145.

Figures 1, 2:
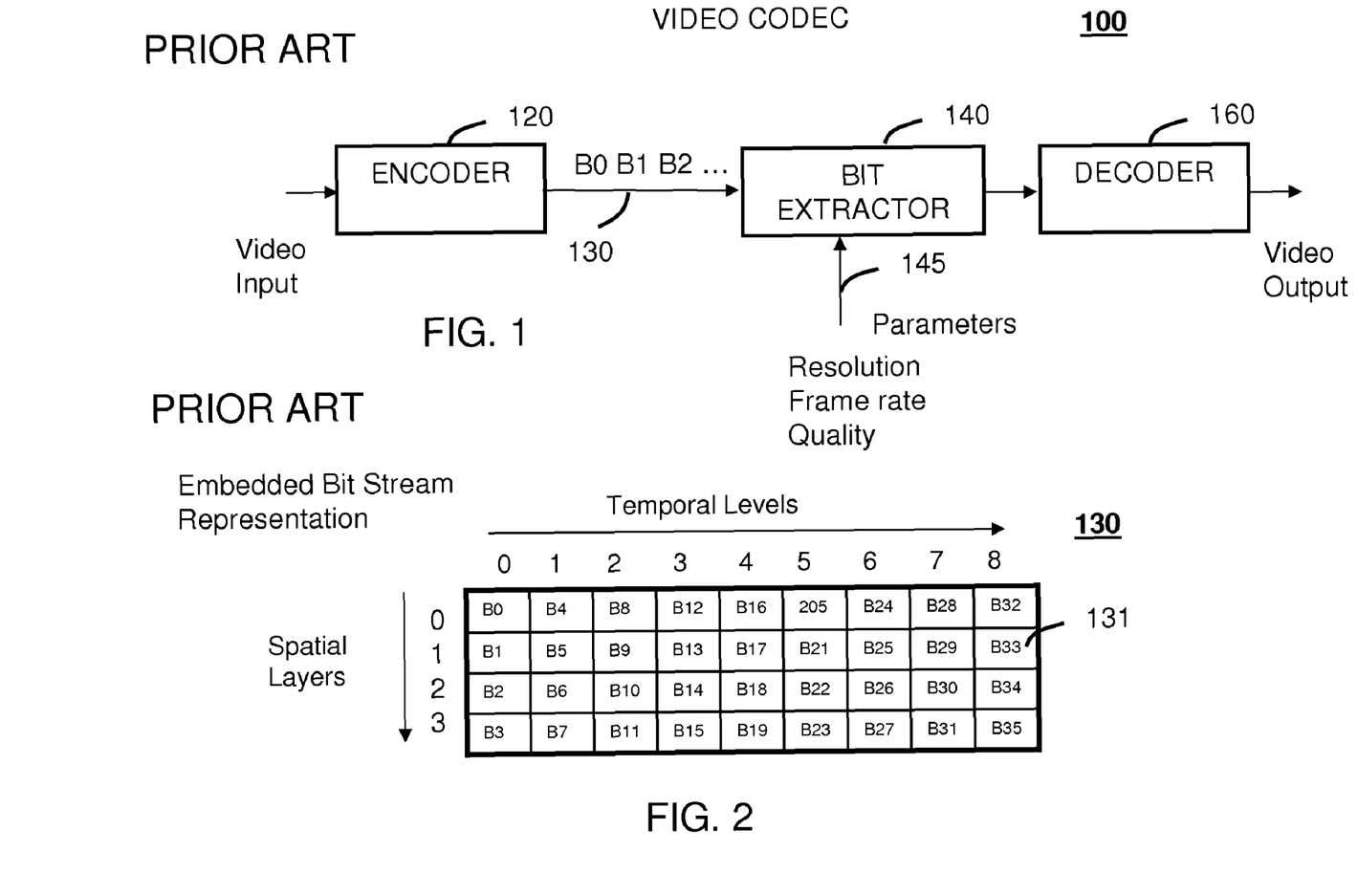
FIG. 1 is a block diagram of a scalable video compression system.
FIG. 2 is a table representation of an embedded bitstream.

Referring to FIG. 2, an exemplary scalable bitstream representation is shown. It should be noted that the bitstream segments (B0-B35) can be saved in various orderings. In the illustration of FIG. 2, the bits are shown in a row (e.g. temporal layers) and column (e.g. spatial levels) format. In practice, each bit 131 of the bitstream is received in a sequential manner that may be dictated by the encoding order. The progressive refinement (PR) slices in the refinement layers of a scalable bitstream can be truncated at any location in the related bitstream segments, with each additional bit providing an improvement to reconstructed video quality. For example, the scalable bitstream may be truncated at the end of the bitstream segment B14 thereby providing only bit segments B0 through B14 for decoding which may be sufficient for a low quality image. Referring back to FIG. 1, the bitstream extractor 140 can truncate an encoded bitstream to obtain a stream at a lower bit rate that will decode at a desired spatial resolution and temporal frame rate, with a SNR quality that is based on the provided user input parameters 145. A range of bit-rates is allowed at each resolution and framerate, with higher rates yielding better SNR quality. For constant bitrate video coding applications, the bitstream extractor shall sequentially collect the relevant bit segments from the given scalable bitstream following the designed bitstream extraction path until the target bit budget is reached. While a theoretically optimal extraction ordering is not clear, various schemes of bit extraction can perform differently for a wide variety of video sequences.

There are three main types of scalability: spatial, temporal, and SNR (quality). Spatial scalability is the ability to decode the bitstream at many different resolutions. Temporal scalability is the ability to decode the bitstream at many different frame rates. SNR scalability is the ability to decode the bitstream at different bit rates to achieve desired quality. For example, a user can adjust parameters 145, such as resolution, frame rate, and quality for setting the spatial, temporal, and SNR scalability. Spatial and temporal scalability are generally provided in a layered manner, where there are a small set of possible resolutions and frame rates. That is, information is provided in layers such that each layer provides an incremental improvement in the video decoding quality. It is possible to provide SNR scalability in a similar layered manner, or in a more continuous manner with an embedded bitstream.

BACKGROUND ART

The joint video team (JVT) of the ITU-T and MPEG standard organizations is in the process of developing new international scalable video coding standards, as a new amendment for the scalable video coding extension of the MPEG-4 AVC/H.264 standard. The new standard is evolved through the Joint Scalable Video Model (JSVM). The reference software, incorporated with the adopted new coding tools, is developed for conduction coding experiments during the standardization activities. The JSVM reference software provides two methods for bit extraction, herein termed Point Extraction and Layer, Level, and Refinement Extraction (LLR) extraction.

Figure 3:
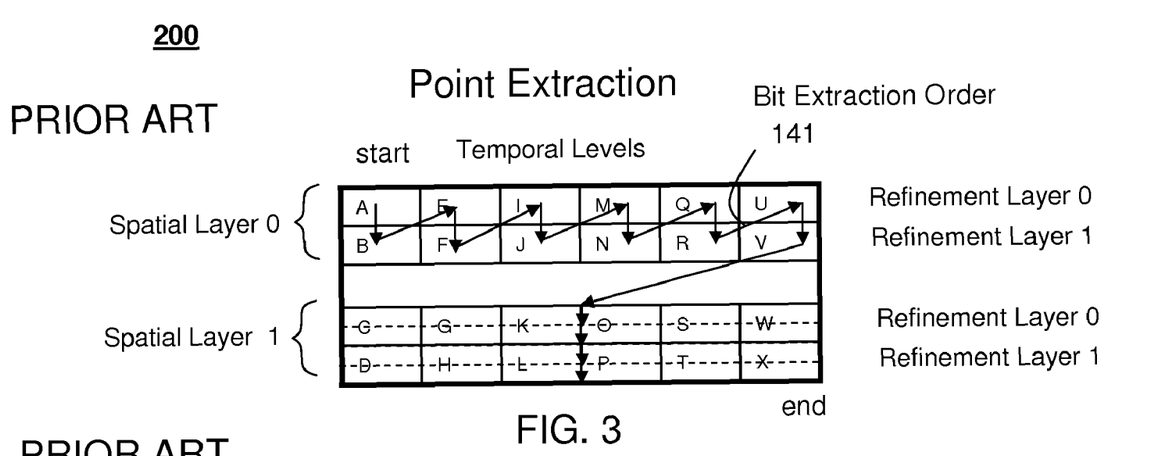
FIG. 3 is a diagram of Point Extraction of the prior art.
Figure 4:
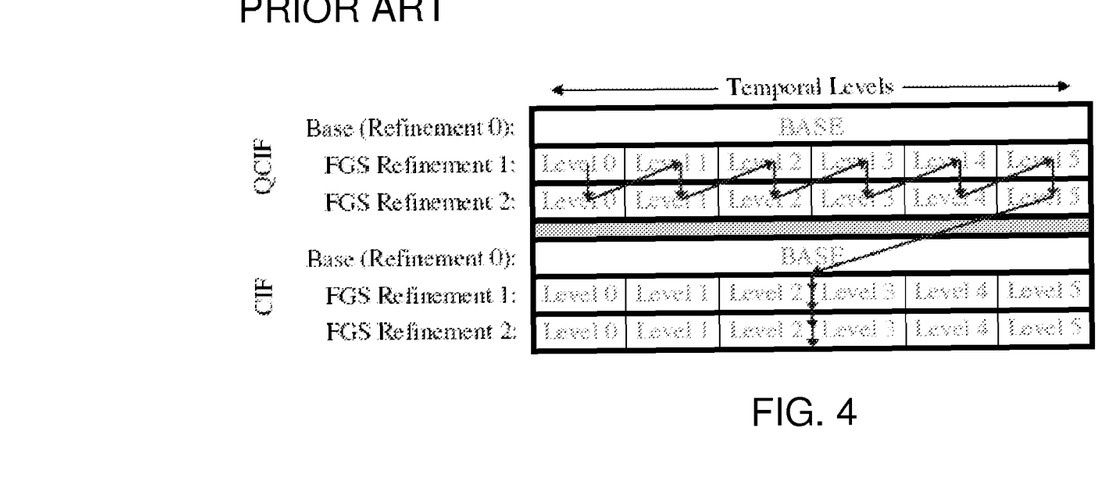
FIG. 4 is another diagram of Point Extraction of the prior art.

For the method of point extraction, a user specifies a point (e.g. bit location) in the embedded bitstream 130 for decoding. The point is associated with a resolution, framerate, and bitrate for video decoding quality. Point Extraction is an intuitive method for bit extraction and one which is user friendly since a desired bitrate is already provided. The method of point extraction 200 is graphically represented in FIG. 3. Bits are extracted from the embedded bit stream 130 as shown by the bit extraction order 141. Notably, Point Extraction 200 is along the same path that the bits were encoded. This may be necessary to avoid 'drift'. The point extraction 200 method operates in accordance with the bit extraction order 141 as follows. It starts at a lowest spatial layer and a lowest temporal level. It includes fine grain scalable (FGS) refinements in order from lowest to highest at this layer and level. While there are more levels at this layer, the codec moves to the next level, and extracts all refinements at this level. For example, there are 2 refinements (A then B) at temporal level 0, spatial level 0. There are also two refinements (G and H) at temporal level 1, spatial layer 1. The number of refinements equal the number of refinement layers. After all refinements for all levels at the lowest layer are extracted, the codec moves to the next higher spatial layer and repeats the process. When the target data rate is met, the codec truncates the data at the current refinement appropriately, and exits. At the highest spatial layer, the codec ensures that all levels will use the same fraction of refinement layers. Another representation of the FGS point extraction method is shown in FIG. 4.

For LLR extraction, the user specifies a number of spatial layers, a number of temporal levels, and a number of FGS refinements to be included in the bitstream. The user is generally restricted to integer values for spatial layers and temporal levels, but may choose decimal values for the FGS refinements, or called progressive refinement slices in the JSVM. In LLR extraction, the bitrate of the extracted stream is not specified. For every spatial layer equal to or less than the given maximum spatial layer, and for every temporal level equal to or less than the given maximum temporal level, refinements are included up until the given refinement truncation point. Because there is no bitrate constraint for this mode and the extracted bitstream segments are fully determined by the input parameters, the order of the bitstream extraction has no impact on the final decoding quality.

The JSVM implements Point Extraction 200 and LLR extraction 250 in different ways. The reconstruction of a point extracted bitstream at a certain bitrate may have a significantly different PSNR value than the reconstruction of an LLR extracted bitstream at the same bitrate. Neither method always outperforms the other with respect to PSNR; selecting the best method is dependent on the point of extraction. Because the JSVM codec is the first international video coding standard to flexibly combine scalability in the temporal, spatial, and FGS dimensions, the problem of optimal bitstream extraction ordering has not been relevant nor addressed in the past outside the current ongoing standardization activities.

SUMMARY

Broadly stated, embodiments of the invention are directed to a bit extractor and method thereof for efficiently decoding a scalable embedded bitstream at different video resolution, framerate, and video quality levels. Embodiments of the invention enable a single compressed scalable bitstream to be more efficiently decided at different video resolution, framerate, and quality levels. In particular, the bit extractor extracts bits in order of the refinement layer, followed by the temporal level, followed by the spatial layer, wherein each bit extracted provides a refinement to a video decoding quality.

In one arrangement, the bit extractor can receive a maximum refinement layer, a maximum temporal level, and a maximum spatial layer to set a video decoding quality for the embedded bitstream. The bit extractor can truncate bit extraction at a position in the embedded bitstream corresponding to the maximum refinement layer, the maximum temporal level, and the maximum spatial layer for achieving the video decoding quality. The bit extractor provides a range for signal-to-noise ration (SNR) scalability given the maximum refinement layer, a range for temporal scalability given the maximum temporal level, and a range for spatial scalability given the maximum spatial layer. For a given refinement layer, the bits are extracted from all spatial layers in a lower temporal level of a refinement layer prior to extracting bits from spatial layers in a higher temporal level of the refinement layer for prioritizing coding gain to increase video decoding quality. In one aspect, the bit extractor can specify a range of bit rates that are available to provide signal-to-noise (SNR) scalability. In another aspect, the bit extractor can specify a range of bit rates that are allowed for each resolution and frame rate.

The bit extractor can start at a lowest spatial layer of a lowest temporal level of a lowest refinement layer. At the lowest refinement layer, for each refinement, bits can be extracted from the lowest temporal level of the lowest spatial layer to a highest temporal level of a highest spatial layer in order of lowest to highest spatial layer. The bit extractor can move to a higher refinement layer, and for each refinement, extract bits from the lowest temporal level of the lowest spatial layer to the highest temporal level of the highest spatial layer in order of lowest to highest spatial layer. The bit extractor can repeat the step of moving to the next refinement layer up until and including the highest refinement layer. For each refinement layer, the bits are extracted from the embedded bitstream in order of refinement for each temporal level layer, followed by each spatial layer. The bit extractor can gather the bits in the embedded bitstream for the decoder in order of coding gain prioritization, such that each additional extracted bit provides a refinement to video decoding quality. The bit extractor can prioritize the bits in the embedded bitstream for coding gain in order of refinement for the refinement layer, followed by the temporal level, followed by the spatial layer. The bits from the spatial layer can provide the highest contribution to video quality, followed by bits from the temporal level, followed by bits from the refinement layer.

Embodiments of the invention are also directed to a method for video encoding. The method can include encoding a first group of bits to create at least one refinement layer of an embedded bitstream, encoding a second group of bits to create at least one temporal level of the embedded bitstream, and encoding a third group of bits to create at least one spatial layer in the embedded bitstream, wherein each spatial layer is encoded using a previous spatial layer for prediction. Bits in the embedded bitstream can be prioritized on coding gain in order of refinement for the refinement layer, followed by the temporal level, followed by the spatial layer. Bits from all spatial layers at the lowest temporal level and refinement are prioritized from lowest spatial layer to highest spatial layer to provide the highest contribution to video quality This is followed by followed by bits from lowest spatial layer to highest spatial layer at the next temporal level for the lowest refinement. This will continue until all spatial layers for all temporal levels are included for the lowest refinement. Bits from the next refinement will then be included in the same order.

BRIEF DESCRIPTION OF THE DRAWINGS

The features of the system, which are believed to be novel, are set forth with particularity in the appended claims. The embodiments herein, can be understood by reference to the following description, taken in conjunction with the accompanying drawings, in the several figures of which like reference numerals identify like elements, and in which:

DETAILED DESCRIPTION

While the specification concludes with claims defining the features of the embodiments of the invention that are regarded as novel, it is believed that the method, system, and other embodiments will be better understood from a consideration of the following description in conjunction with the drawing figures, in which like reference numerals are carried forward.

As required, detailed embodiments of the present method and system are disclosed herein. However, it is to be understood that the disclosed embodiments are merely exemplary, which can be embodied in various forms. Therefore, specific structural and functional details disclosed herein are not to be interpreted as limiting, but merely as a basis for the claims and as a representative basis for teaching one skilled in the art to variously employ the embodiments of the present invention in virtually any appropriately detailed structure. Further, the terms and phrases used herein are not intended to be limiting but rather to provide an understandable description of the embodiment herein.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "refinement layer" can be defined as a coding level used for both Fine Grain Scaling (FGS) quality enhancement and for an overall process of providing better video to a decoder. The term "embedded bit stream" can be defined as a collection of bits interdispersed within a memory, or communication channel. The term "temporal level" can be defined as collection of bits that are ordered based on time. The term "spatial layer" can be defined as a collection of bits that are ordered based on association. The term "bit budget constraint" can be defined as a limitation on a number of bits used for encoding. The term "quality enhancement" can be defined as an increase in temporal resolution, spatial resolution, or combination thereof. The term "video decoding quality" can be defined as an increase in signal to noise ratio in temporal resolution, signal to noise ratio in spatial resolution, or combination thereof.

FIG. 1 shows the Scalable Video Compression (SVC) system 100 for efficient video coding. The SVC system 100 may be implemented in software by a processor such as a microprocessor or a digital signal processor (DSP) as is known in the art, or any other suitable electronic device. The functions of the SVC system 100 may also be implemented in hardware such as an ASIC or FPGA as is known in the art, or any other suitable hardware. As previously noted, the SVC system 100 can include the encoder 120, the bitstream extractor 140, and the decoder 160. The encoder 120 can receive a stream of video input representing a plurality of images over time. The encoder 120 can compress the video input and generate the embedded bitstream 130 representing the video input. The embedded bitstream 130 is shown in FIG. 2 The SVC system 100 can also receive input parameters 145 for setting a video decode quality. The SVC system 100 is scalable in the sense that the video decode quality can be scaled in accordance with the parameters 145. The SVC system 100 is capable of offering a wide variety of single or combined scalable decoding options, such as spatial, temporal, and quality, from a single embedded bitstream. This allows the SVC system 100 to provide low-end video embedded in high-end video bitstream data.

The operations of the encoder 120 and decoder 160 are separated to provide efficient storage, transmission, media management, and error resiliency. The encoder 120 can encode input video and extract the relevant bit-stream segments for serving different decoding resource constraints. The Encoder 120 can generate a scalable bit-stream that can be flexibly extracted in different ways to meet spatio-temporal resolution and bit-rate constraints of the video decoder 160. The bit extractor 140 can extract bits from the embedded bitstream 130 in a specified order. The bit extraction may depend on the number of spatial layers, the temporal levels, and the refinement layers and bitrate desirable for decoding. The bit extractor can extract the bits in the embedded bitstream for the decoder in order of coding gain prioritization, such that each additional extracted bit provides an efficient refinement to video decoding quality.

Figure 5:
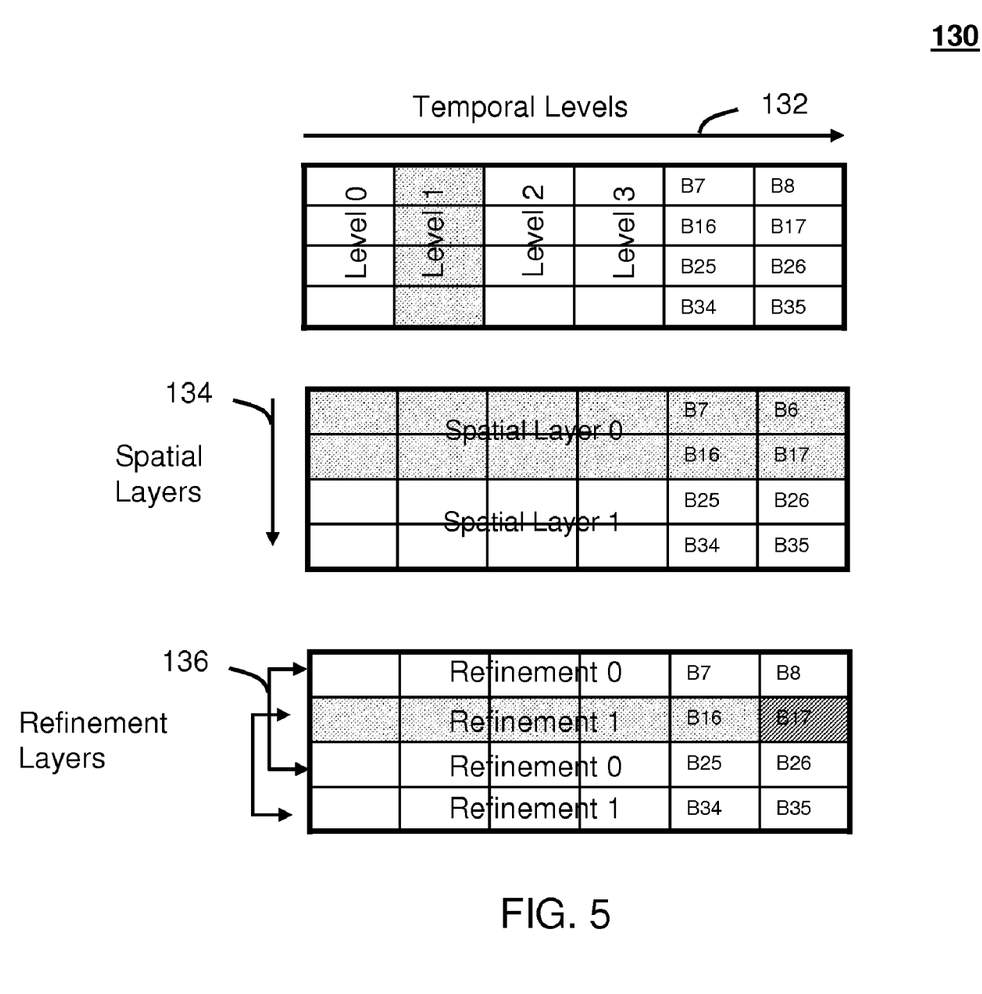
FIG. 5 is an illustration of temporal level, spatial layer, and refinement layer of an embedded bitstream in accordance with the embodiments of the invention.

Referring to FIG. 5, an illustration for the embedded bitstream 130 as arranged by temporal level, spatial layer, and refinement level is shown. In particular, the embedded bitstream 130 can be represented by a number of temporal levels 132, a number of spatial layers 134, and a number of refinement layers 136. The number of temporal levels 132 can be given as an input to establish the temporal scalability, the number of spatial layers 134 can be given as an input to establish the spatial scalability, and a number of refinement layers 136 can be given as an input to establish the SNR scalability. The embedded bitstream representation 130 presents a visual relationship between temporal scalability, spatial scalability, and SNR scalability.

Figure 6:
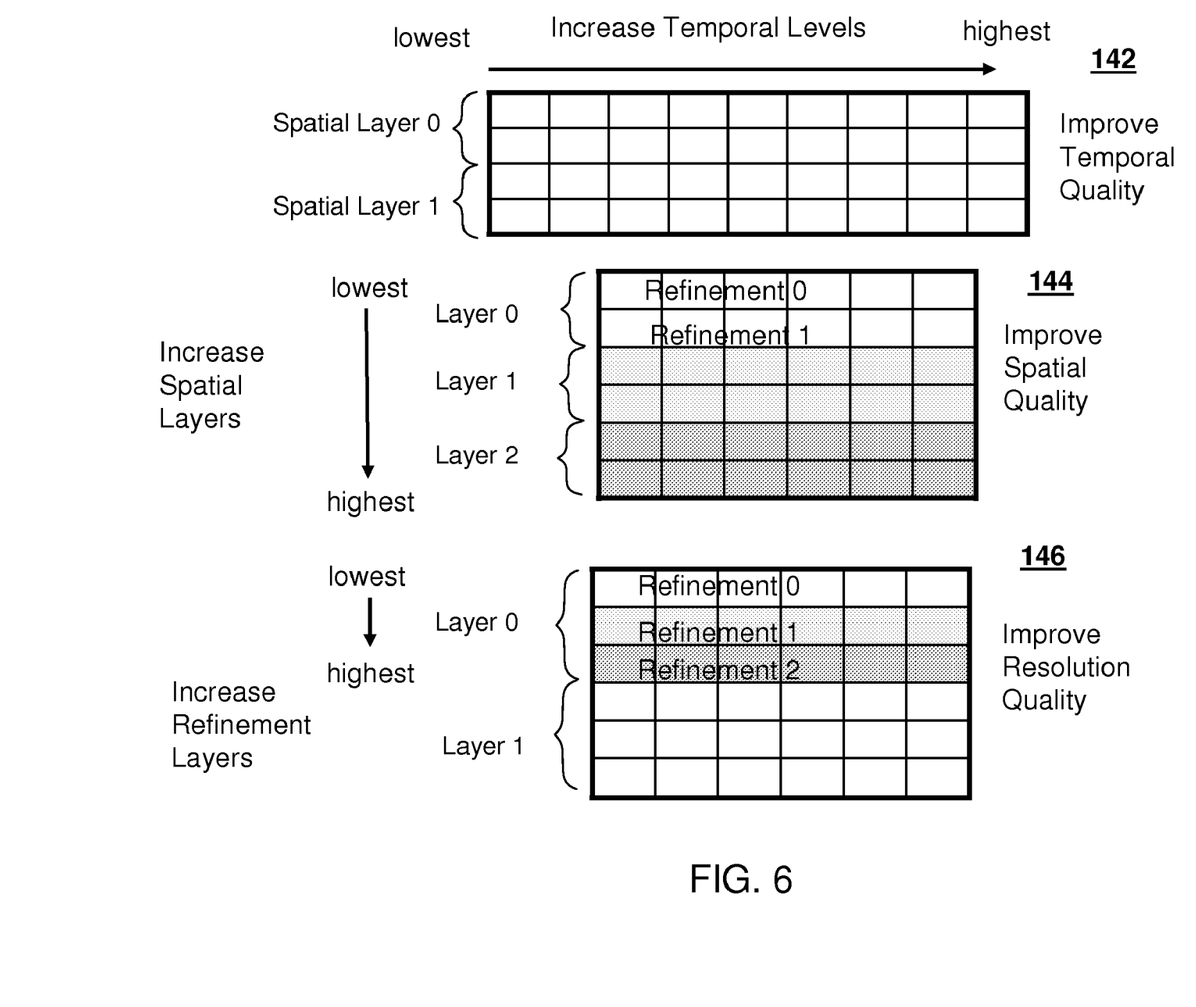
FIG. 6 is an illustration of adjusting the temporal level, spatial layer, and refinement layer of an embedded bitstream in accordance with the embodiments of the invention.

Referring to FIG. 6, various representations of the embedded bitstream 130 are shown. As one example, referring to the embedded bitstream 142, increasing the number of temporal levels can improve temporal quality. As another example, referring to the embedded bitstream 144, increasing the number of spatial layers can improve spatial quality. As yet another example, referring to the embedded bitstream 146, increasing the number of refinement layers can improve SNR quality. Notably, the number of temporal levels, spatial levels, and refinement levels can be set by the user parameters 145 of FIG. 1. Changing the number of temporal levels, spatial levels, or refinement levels can change the video decoding quality.

Referring back to FIG. 1, the bit extractor 140 can extract bits from the embedded bitstream 130 in order of refinement layer 136, followed by temporal level 132, followed by spatial layer 134. The decoder 160 can create a video from the bits extracted by the bit extractor. The bit extractor 140 can receive parameters including a resolution, a frame rate, and a bit rate to provide scalable video decoding, and convert the parameters to the corresponding given refinement layer, the given temporal level, and the given spatial layer for achieving the resolution, the frame rate, and the bit rate. The video can have a video decoding quality dependent on the given number of refinement layers 136, the given number of temporal levels 132, and the given number of spatial layers 134. The bit extractor 140 can specify a range of bit rates that are allowed for each resolution and frame rate, and a range of bit rates that are available to provide signal-to-noise (SNR) scalability. For example, the bit-extraction module 140 can receive the given refinement layer, the given temporal level, and the given spatial layer for setting a video decoding quality, and truncate the bit extraction at a position in the embedded bitstream 130 corresponding to the given refinement layer 136, the given temporal level 132, and the given spatial layer 134 for achieving the video decoding quality.

Referring back to FIG. 1, the bit extractor 140 can extract bits in different orders. One such bit extraction order, as previously recited in the prior art, is the method of Point Extraction 200 as shown in FIG. 3. Another bit extraction order, as previously recited in the prior art, is the method of Layer, Level, and Refinement (LLR) 250 as shown in FIG. 4. One drawback of the point extraction 200 and LLR extraction 250 methods is that splitting bits among all temporal levels in not efficient.

The authors have demonstrated that bits from lower temporal levels provide more gain than bits from higher temporal levels. Accordingly, the bits can be reordered, with respect to bit extraction, based on the priority of the bits for coding gain. Rate-distortion curves in simulation have shown that up to 2 dB can be gained in end-to-end video decoding quality gain by re-ordering the bits in accordance with the embodiments of the invention. In practice, bits from lower temporal levels are extracted before bits from higher temporal levels. Specifically, bits are extracted in order of refinement, followed by temporal level, followed by spatial layer. Such a bit extraction ordering via a prioritization-based reordering of the bit extraction scheme yields higher end to end quality. The refinement followed by the temporal followed by the spatial is referred to as FTS, and is a novel aspect of the invention. The order of bit extraction is distinguished from the bit extraction ordering of the LLR and Point Extraction methods.

Figure 7:
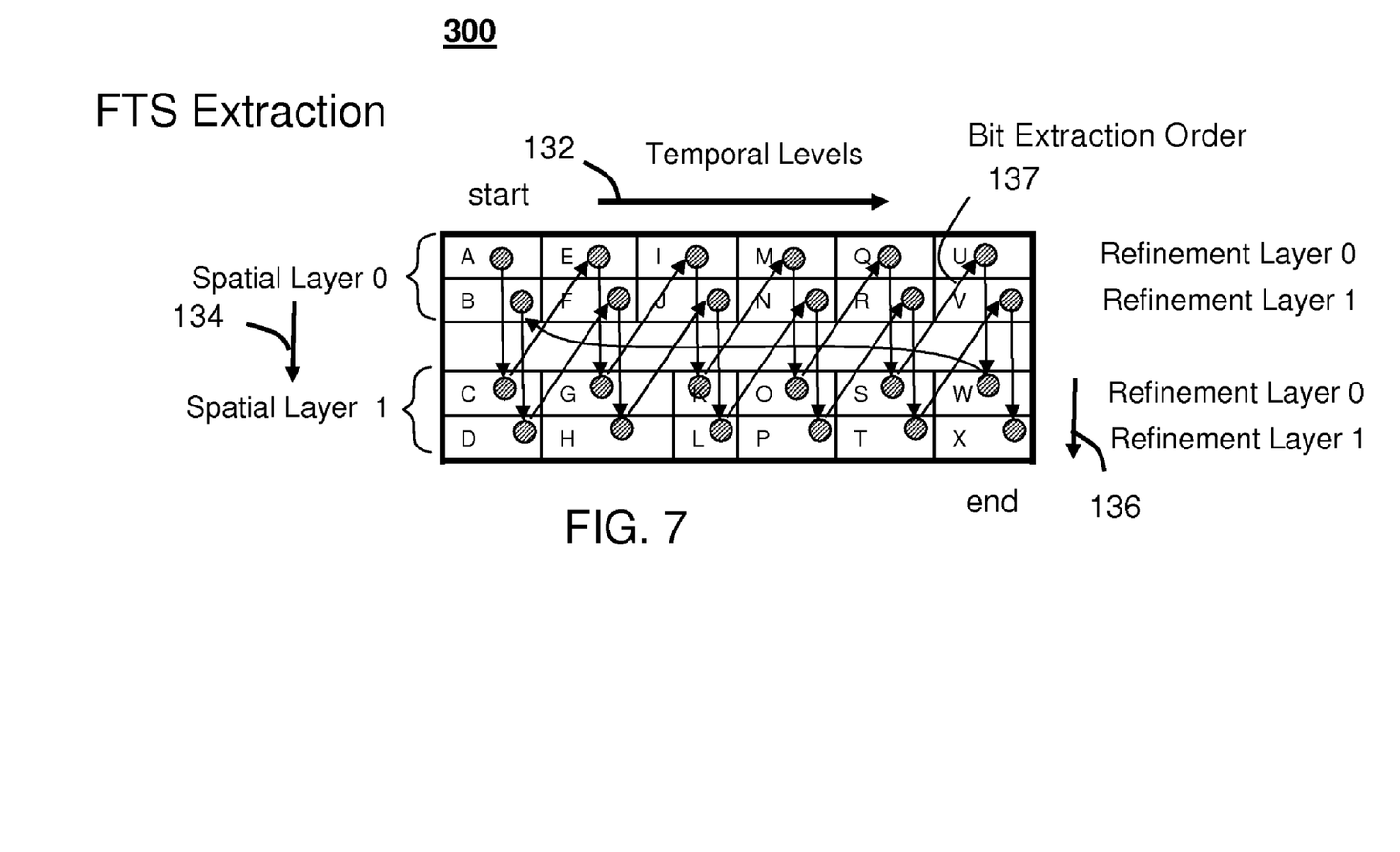
FIG. 7 is a method of Refinement layer, Temporal Level, and Spatial Layer (FTS) in accordance with the embodiments of the invention.

Referring to FIG. 7, the bit extraction order 137 for the FTS method is shown. The FTS method operates in accordance with the bit extraction order 137 as follows. For each refinement in a refinement layer 136, bits from the lowest temporal level of the lowest spatial layer are first extracted. Bits from all the spatial layers at this temporal level and refinement layer are then extracted in order. Then, the bit extractor 140 moves to the next temporal level 132 and extracts bits from the spatial layers 134 in order from lowest to highest. Once all temporal levels and spatial layers are extracted at the lowest refinement, the encoder moves to the next refinement and repeats the process.

Figure 8:
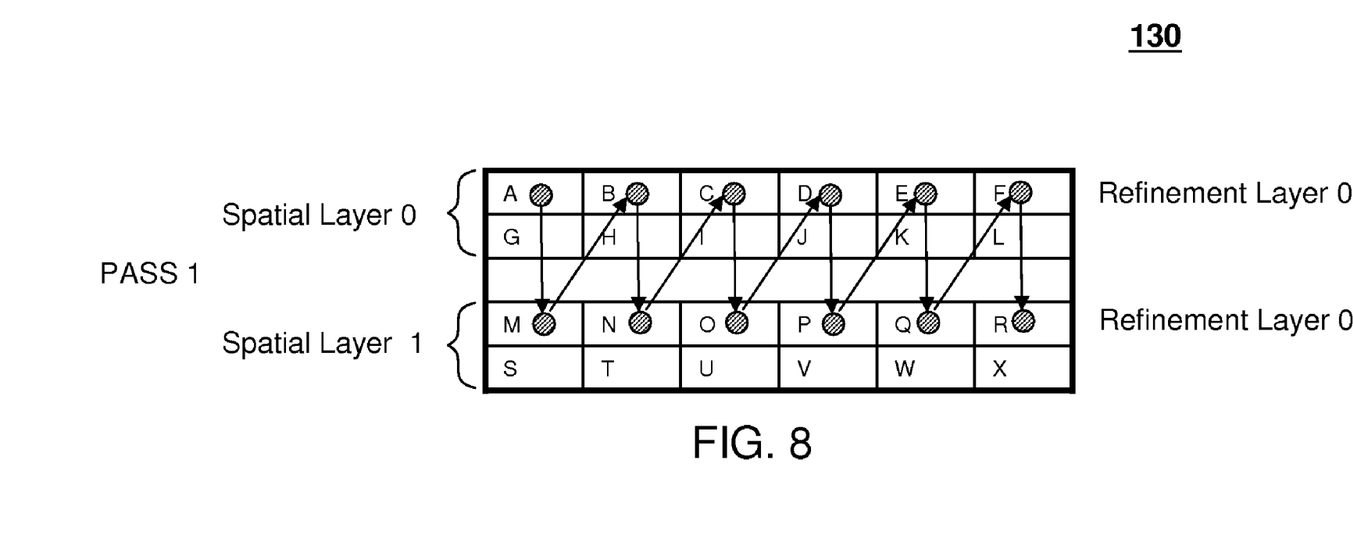
FIG. 8 is a first pass of a bit extraction order for FTS in accordance with the embodiments of the invention.

For example, referring to FIG. 8, a first pass for extracting bits in accordance with the bit extraction order 137 from the embedded bitstream 130 is shown. The bit extraction order explicitly specifies a distinct order of extraction for the bits in the embedded bitstream 130. In particular, the first pass is associated with Refinement Layer 0, which is the lowest refinement layer. That is, bits are first extracted from the all spatial layers 134 and all temporal levels 132 before bits from Refinement Layer 1 are extracted. All the bits are extracted in order of refinement, followed by temporal level, followed by spatial layer as shown by the bit extraction order 137. Notably, all bits are extracted from all spatial layers in a lower temporal level prior to extracting bits from spatial layers in a higher temporal level for prioritizing coding gain.

Figure 9:
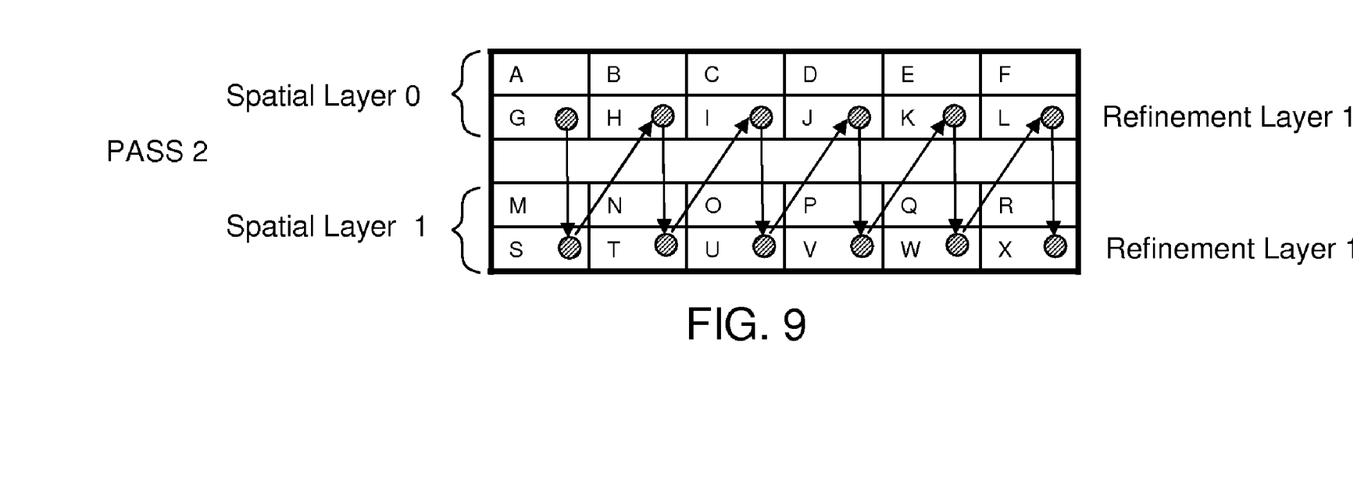
FIG. 9 is a second pass of a bit extraction order for FTS in accordance with the embodiments of the invention.

Referring to FIG. 9, a second pass for extracting bits in accordance with the bit extraction order 137 from the embedded bitstream 130 is shown. In particular, the second pass is associated with Refinement Layer 1, which is the next highest refinement layer. Bits are extracted from the all spatial layers 134 and all temporal levels 132 in Refinement Layer 1. Since the Refinement Layer only contains two refinements, the bit extraction ends at the completion of the second pass. Notably, the method of bit extraction exemplified by the bit extraction order 137 would be replicated for further refinements.

Figure 10:
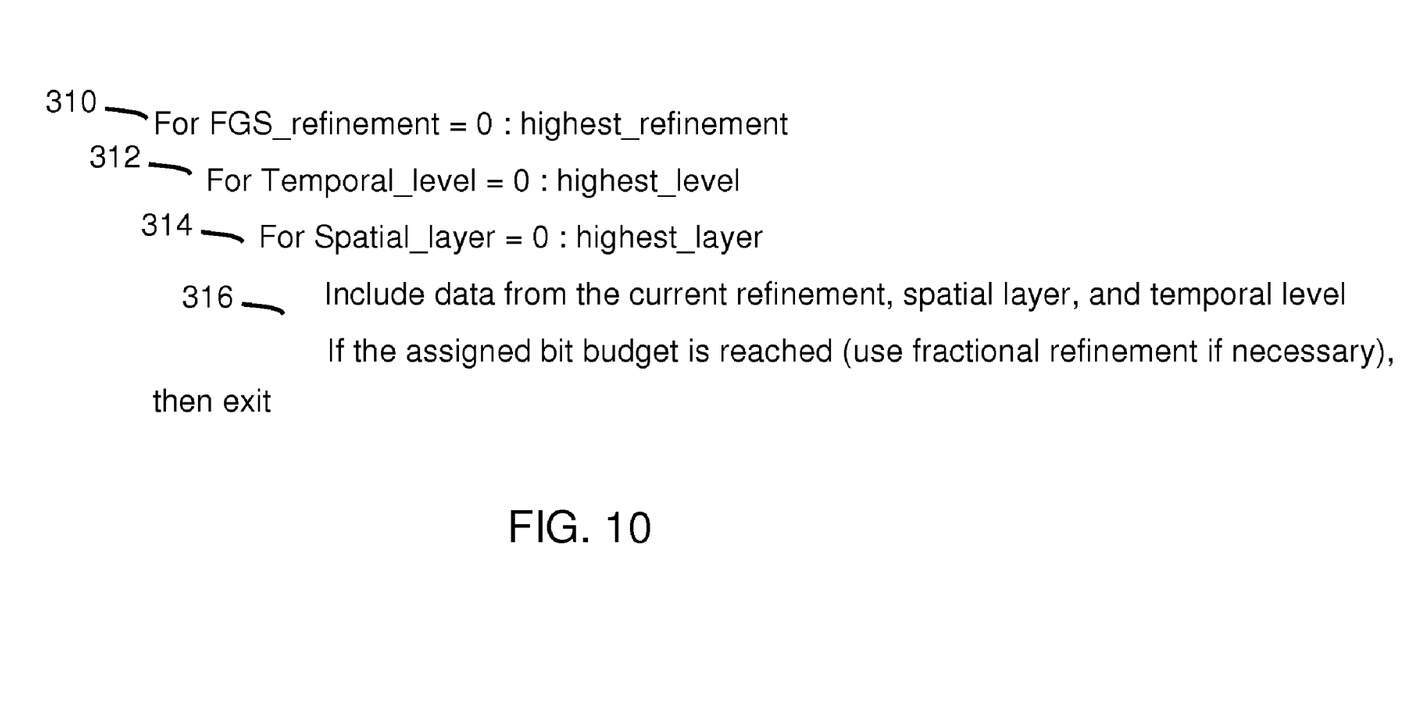
FIG. 10 is pseudo code for the method of FTS in accordance with the embodiments of the invention.

The FTS method can be implemented with the below pseudo code as also shown in FIG. 10.

```
(310) For FGS_refinement = 0 : highest_refinement
    (312) For Temporal_level = 0 : highest_level
        (314) For Spatial_layer = 0 : highest_layer
            (316) Include data from the current refinement, spatial layer,
                and temporal level.
                If the assigned bit budget is reached (use fractional
                refinement if necessary), then exit
```

In practice, (310) for a given refinement layer 136, (312) for a given temporal level 132, and (314) for a given spatial layer 134, (316) bits are extracted from a lowest spatial layer to a highest spatial layer for the given temporal level and the given refinement layer. The FTS method 300 repeats (314) for a lowest spatial layer up to a maximum spatial layer, repeats (312) for a lowest temporal level up to a maximum temporal level, and repeats (310) for a lowest refinement layer up to a maximum refinement layer.

Referring back to FIG. 5, it should be noted that the bit extractor 140 performs the method for extracting bits from the embedded bitstream 130. The bit extractor 140 extracts bits from the embedded bit stream in order of coding gain priority. That is, bits are extracted in an order that can most efficiently reduce coding distortion. For example, referring to FIG. 5, bits at lower temporal levels, such as those in Level 0, provide more gain than bits at higher temporal levels, such as those in Level 3. Accordingly, the bits are extracted before bits from higher temporal levels to exploit coding gain. In another arrangement, the bits can be extracted by a host processor (not shown) that is communicatively coupled to the SVC system 100 of FIG. 1.

Notably, the bit extraction method of FTS is significantly different from the bit extraction performed by the prior art methods of Point Extraction 200 and LLR. In Point Extraction 200, bits are extracted in order of spatial layer 134, followed by temporal level 132, followed by refinement layer 136. In FTS 300, bits are extracted in order of refinement layer, followed by temporal level 132, followed by spatial layer 134. LLR is not directly applied to constant bit-rate coding.

Embodiments of the invention are also directed to a method for creating an embedded bitstream suitable for use in scalable video encoding. The method includes prioritizing the bits in the embedded bitstream for coding gain in order of refinement for the refinement layer, followed by the temporal level, followed by the spatial layer.

Where applicable, the present embodiments of the invention can be realized in hardware, software or a combination of hardware and software. Any kind of computer system or other apparatus adapted for carrying out the methods described herein are suitable. A typical combination of hardware and software can be a mobile communications device with a computer program that, when being loaded and executed, can control the mobile communications device such that it carries out the methods described herein. Portions of the present method and system may also be embedded in a computer program product, which comprises all the features enabling the implementation of the methods described herein and which when loaded in a computer system, is able to carry out these methods.

While the preferred embodiments of the invention have been illustrated and described, it will be clear that the embodiments of the invention is not so limited. Numerous modifications, changes, variations, substitutions and equivalents will occur to those skilled in the art without departing from the spirit and scope of the present embodiments of the invention as defined by the appended claims.

What is claimed is:

1. A method for scalable bitstream extraction suitable for use in video processing, comprising the steps of:
receiving an embedded bitstream having at least one refinement layer, at least one temporal level, and at least spatial layer; and
extracting bits from the embedded bitstream given a bit budget constraint to provide a quality enhancement to a video decoding quality, wherein the extraction is first performed from a lower spatial layer to a higher spatial layer for each temporal level in order of lower temporal level to higher temporal level in a given refinement layer and wherein the extraction is repeated for each refinement layer from a lower refinement layer to a higher refinement layer.

2. The method of claim 1, further comprising:
receiving a maximum refinement layer number, a maximum temporal level number, and a maximum spatial layer number for setting a video decoding quality; and
truncating the step of extracting the bits at a position in the embedded bitstream corresponding to the maximum refinement layer number, the maximum temporal level number, and the maximum spatial layer number for achieving the video decoding quality.

3. The method of claim 2, further comprising:
providing a range for signal-to-noise ratio (SNR) scalability in view of the maximum refinement layer number;
providing a range for temporal scalability in view of the maximum temporal level number; and
providing a range for spatial scalability in view of the maximum spatial layer number.

4. The method of claim 1, wherein the step of extracting bits is stopped
if the assigned bit budget is reached.

5. The method of claim 1, wherein the step of extracting bits is an extraction order comprising:
extracting data from a given spatial layer to a higher spatial layer for each temporal level in order of a given temporal level to a higher temporal level in a given refinement layer, wherein the extraction is repeated for each refinement layer from the given refinement layer to a higher refinement layer, and further wherein the extraction is ended if the assigned bit budget constraint is reached.

6. The method of claim 5, wherein the step of extracting bits in order comprises:
at a lowest refinement layer, for each refinement, extracting bits from a lowest temporal level of a lowest spatial layer to a highest temporal level of a highest spatial layer in order of lowest to highest spatial layer;
moving to a higher refinement layer, for each refinement, extracting bits from the lowest temporal level of the lowest spatial layer to the highest temporal level of the highest spatial layer in order of lowest to highest spatial layer; and
repeating the step of moving to the next refinement layer until and including the highest refinement layer.

7. The method of claim 6, wherein for each refinement layer, the bits are extracted from the embedded bitstream utilizing fractional refinement if necessary.

8. A scalable video compression system suitable for use in video processing, comprising:
an encoder that compresses the video input and generate an embedded bitstream with at least one refinement layer, at least one temporal level, and at least one spatial layer;
a bit extractor that extracts bits, given a bit budget constraint, from the embedded bitstream, wherein the extraction is first performed from a lower spatial layer to a higher spatial layer for each temporal level in order of lower temporal level to higher temporal level in a given refinement layer and wherein the extraction is repeated for each refinement layer from a lower refinement layer to a higher refinement layer; and
a decoder that creates an image from the extracted bits that has a video decoding quality dependent on a given refinement layer, a given temporal level, and a given spatial layer,
wherein the bit extractor is implemented in a processor.

9. The scalable video compression system of claim 8, wherein the bit extractor receives parameters including a resolution, a frame rate, and a bit rate to provide scalable video decoding, and converts the parameters to the corresponding given refinement layer, the given temporal level, and the given spatial layer for achieving the resolution, the frame rate, and the bit rate.

10. The scalable video compression system of claim 9, wherein the bit extractor specifies a range of bit rates that are allowed for each resolution and frame rate.

11. The scalable video compression system of claim 9, wherein the bit extractor specifies a range of bit rates that are available to provide signal-to-noise (SNR) scalability.

12. The scalable video compression system of claim 9, wherein the bit-extraction module receives the given refinement layer, the given temporal level, and the given spatial layer for setting a video decoding quality, and truncates the bit extraction at a position in the embedded bitstream corresponding to the given refinement layer, the given temporal level, and the given spatial layer for achieving the video decoding quality.

13. The scalable video compression system of claim 8, wherein the bit extractor
extracts data from a given spatial layer to a higher spatial layer for each temporal level in order of a given temporal level to a higher temporal level in a given refinement layer, wherein the extraction is repeated for each refinement layer from the given refinement layer to a higher refinement layer, and further wherein the extraction is ended if the assigned bit budget constraint is reached.

14. The scalable video compression system of claim 8, wherein the bit extractor gathers the bits in the embedded bitstream for the decoder in order of coding gain prioritization, such that each additional extracted bit provides a refinement to video decoding quality.

15. A method for creating an embedded bitstream suitable for use in video encoding, comprising:
encoding a first group of bits to create at least one refinement layer of an embedded bitstream;
encoding a second group of bits to create at least one temporal level of the embedded bitstream; and
encoding a third group of bits to create at least one spatial layer in the embedded bitstream;
receiving the embedded bitstream having at least one refinement layer, at least one temporal level, and at least spatial layer; and extracting bits given a bit budget constraint, wherein the extraction is first performed from a lower spatial layer to a higher spatial layer for each temporal level in order of lower temporal level to higher temporal level in a given refinement layer and wherein the extraction is repeated for each refinement layer from a lower refinement layer to a higher refinement layer.

16. The method of claim 15, further comprising:
extracting data from a given spatial layer to a higher spatial layer for each temporal level in order of a given temporal level to a higher temporal level in a given refinement layer, wherein the extraction is repeated for each refinement layer from the given refinement layer to a higher refinement layer, and further wherein the extraction is ended, utilizing a fractional refinement, if the assigned bit budget constraint is reached.

17. The method of claim 15,
wherein bits from the spatial layer provide the highest contribution to video quality, followed by bits from the temporal level, followed by bits from the refinement layer.

* * * * *